/ 
US006983385B2

(12) United States Patent
German et al.

(10) Patent No.: US 6,983,385 B2
(45) Date of Patent: Jan. 3, 2006

(54) CONFIGURABLE BASEBOARD TO POWER A MEZZANINE CARD AND METHOD

(75) Inventors: Mark S. German, Chandler, AZ (US); David C. Campbell, Gilbert, AZ (US); Daniel R. Kibel, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 564 days.

(21) Appl. No.: 10/261,930

(22) Filed: Sep. 30, 2002

(65) Prior Publication Data
US 2004/0064744 A1   Apr. 1, 2004

(51) Int. Cl.
G06F 1/26 (2006.01)
H05K 7/10 (2006.01)

(52) U.S. Cl. ..................................... 713/300; 710/301
(58) Field of Classification Search ................ 713/300; 710/301
See application file for complete search history.

(56) References Cited

U.S. PATENT DOCUMENTS

| | | | | |
|---|---|---|---|---|
| 4,851,614 A | * | 7/1989 | Duncan, Jr. | 174/263 |
| 5,326,937 A | * | 7/1994 | Watanabe | 174/263 |
| 5,414,223 A | * | 5/1995 | Suski et al. | 174/262 |
| 5,420,378 A | * | 5/1995 | Estes et al. | 174/263 |
| 5,805,903 A | * | 9/1998 | Elkhoury | 713/300 |
| 6,013,876 A | * | 1/2000 | Caporizzo | 174/262 |
| 6,149,319 A | * | 11/2000 | Richter et al. | 713/300 |
| 6,295,210 B1 | * | 9/2001 | Lanzone et al. | 361/799 |

OTHER PUBLICATIONS

Bus Architecture Standards Committee of the IEEE Computer Society, "Draft Standard for a Common Mezzanine Card Family: CMC", Apr. 22, 2000, IEEE, P1386/Draft 2.2, pp. 24-39.*

* cited by examiner

Primary Examiner—Thomas Lee
Assistant Examiner—Ji H. Bae
(74) Attorney, Agent, or Firm—Kevin D. Wills (57) ABSTRACT

A computer system (200) includes a baseboard (202) having a first side (201) and a second side (203), where the first side and the second side define a first key opening (205) and a second key opening (207). A mezzanine card interface (208) is coupled to the baseboard. A keying mechanism (219) is coupled to interface with the baseboard through the first key opening, where coupling the keying mechanism to the baseboard initiates a first key signal (225), and where the first key signal operates a logic circuit (229) to permit a first operating voltage (218) to power the mezzanine card interface. Alternatively, the keying mechanism can be coupled to interface with the baseboard through the second key opening, where coupling the keying mechanism to the baseboard initiates a second key signal (227), and where the second key signal operates the logic circuit to permit a second operating voltage (220) to power the mezzanine card interface.

This configuration mechanism is repeated for any other mezzanine card interfaces on the baseboard. The logic circuit (229) disallows the application of operating voltages to the mezzanine card interfaces if the configurations are not compatible with the architecture of the baseboard. In the event of incompatible configurations, the logic circuit also communicates a configuration failure signal to the operator or system manager.

22 Claims, 8 Drawing Sheets

CONFIGURABLE BASEBOARD TO POWER A MEZZANINE CARD AND METHOD

BACKGROUND OF THE INVENTION

In a given generation of products, the embedded electronics manufacturer strives to design for compatibility with both legacy products as well as the newest, highest performance products of the future. This gives the best product flexibility and usefulness to the widest range of customers. To attain these goals, it is desirable for baseboards that support mezzanine cards to be designed to support multiple generations of mezzanine cards whose bus interfaces to the baseboard require different operating voltages or different signaling voltages. Most prior art implementations utilize a physical keying mechanism so that only mezzanine cards with compatible operating voltages can interface with the baseboard. This prevents damage to the baseboard, mezzanine card and the entire computer system. Thus, the baseboard must be configured differently for each mezzanine card operating voltage.

Two types of configuration implementations exist in prior art. In the first, the operating voltage supplied to a given mezzanine card interface is set during the manufacture of the baseboard. Through the appropriate population of onboard components, a preset operating voltage is routed to each mezzanine card interface and the physical keying mechanism is attached in the corresponding position. Through a different population of onboard components and a different physical key position, a different preset operating voltage can be routed to each mezzanine card interface. This allows one baseboard design to support mezzanines with different operating voltage requirements. A disadvantage of this method is that it is not field-reconfigurable for other mezzanine cards with different operating voltages.

In the second implementation, the operating voltage supplied to a given mezzanine card interface is set in a way that is field-reconfigurable, such as using jumpers. Thus, to change a mezzanine interface from one operating voltage to another, a user would be required to:

1) Change the jumper position to select a different operating voltage, and

2) Move the physical keying mechanism to the corresponding position. A disadvantage of this method is that it allows the possibility of incompatible configurations with no fault protection. For example, a user could install the physical key in a position that does not match the jumper-selected operating voltage, in which case the wrong operating voltage might be applied to the mezzanine card, causing damage. Accordingly, there is a significant need for an apparatus and method that overcomes the disadvantages of the prior art outlined above.

BRIEF DESCRIPTION OF THE DRAWINGS

Referring to the drawing.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings (where like numbers represent like elements), which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical, electrical, or logical contact. However, "coupled" may mean that two or more elements are not in direct contact with each other, but yet still co-operate or interact with each other.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

Figure 1:
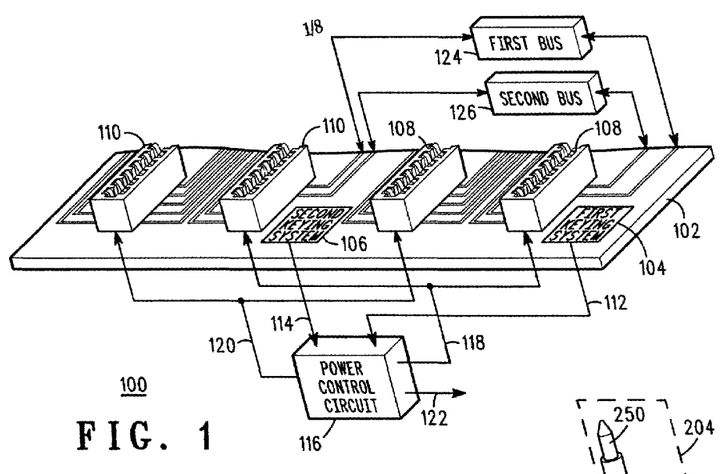
FIG. 1 is a block diagram of a computer system in accordance with an embodiment of the invention.

FIG. 1 is a block diagram of a computer system 100 in accordance with an embodiment of the invention. As shown in FIG. 1, computer system 100 can include baseboard 102 having first mezzanine card interface 108 and second mezzanine card interface 110. In embodiment, baseboard 102 can be a VMEbus board having a VMEbus board form factor. VMEbus form factor, including mechanical dimensions, electrical specifications, and the like are known in the art and set forth in the ANSI/VITA 1-1994 and ANSI/VITA 1.1-1997 standards promulgated by the VMEbus International Trade Association (VITA), P.O. Box 19658, Fountain Hills, Ariz., 85269 (where ANSI stands for American National Standards Institute).

In still another embodiment, baseboard 102 can be a CompactPCI® board having a CompactPCI form factor.

CompactPCI form factor, including mechanical dimensions, electrical specifications, and the like, are known in the art and set forth in the CompactPCI Specification, by PCI Industrial Computer Manufacturers Group (PCIMG™), 301 Edgewater Place, Suite 220, Wakefield, Mass.

In yet another embodiment, baseboard 102 can be an Advanced Telecommunications Computer Architecture (AdvancedTCA™) board having an AdvancedTCA form factor. AdvancedTCA form factor, including mechanical dimensions, electrical specifications, and the like, are known in the art and set forth in the AdvancedTCA Specification, by PCI Industrial Computer Manufacturers Group (PCIMG), 301 Edgewater Place, Suite 220, Wakefield, Mass.

In still yet another embodiment, baseboard 102 can be an Advanced Packaging System (APS) board having an APS form factor. APS form factor, including mechanical dimensions, electrical specifications, and the like, are known in the art and set forth in the ANSI/VITA Specification 34.

First mezzanine card interface 108 and second mezzanine card interface 110 are each designed to receive a mezzanine card (not shown for clarity). In an embodiment, baseboard 102 supplies mezzanine card with power and communicates with mezzanine card via first mezzanine card interface 108 and/or second mezzanine card interface 110. Although two mezzanine card interfaces are shown in FIG. 1, any number of mezzanine card interfaces are within the scope of the invention.

Although any type of mezzanine card is within the scope of the invention, in an exemplary embodiment is a Common Mezzanine Card (CMC) having a CMC form factor. CMC form factor, including mechanical dimensions, electrical specifications, and the like, are known in the art and set forth in the Institute of Electrical and Electronics Engineers (IEEE) standard P1386. A particular example of an embodiment is a PCI mezzanine card (PMC) having a PMC form factor. PMC form factor, including mechanical dimensions, electrical specifications, and the like, are known in the art and also set forth in the Institute of Electrical and Electronics Engineers (IEEE) standard P1386.1.

In an embodiment, first mezzanine card interface 108 and second mezzanine card interface 110 can be a CMC interface. In another embodiment, first mezzanine card interface 108 and second mezzanine card interface 110 can be a PCI mezzanine card interface. Both CMC interface and PCI mezzanine card interface are known in the art and are in conformance with the respective specifications listed above. First mezzanine card interface 108 and second mezzanine card interface 110 are not limited to CMC and PMC interfaces. Any type of mezzanine card and mezzanine card interface is within the scope of the invention.

In an embodiment, computer system 100 can also include first bus 124 and second bus 126 operating on baseboard 102. First bus 124 and second bus 126 can interconnect various components on baseboard 102 so that they can communicate with each other. First bus 124 and second bus 126 can also be coupled to any mezzanine cards coupled to baseboard 102, through, for example, first mezzanine card interface 108 and second mezzanine card interface 110 respectively. In other words, first bus 124 and/or second bus 126 can be used for communication between other components on baseboard 102 and any mezzanine cards coupled to baseboard 102, with first bus 124 and/or second bus 126 interfacing with mezzanine card(s) through first mezzanine card interface 108 and/or second mezzanine card interface 110. In another embodiment, only first bus 124 is present to interconnect with first mezzanine card interface 108 and/or second mezzanine card interface 110. In another embodiment, any number of buses can be utilized on baseboard 102.

First bus 124 and second bus 126 can operate using any type of protocol, for example and without limitation, VMEbus, Peripheral Component Interconnect (PCI and PCI-X), RapidIO™, Serial RapidIO™, PCI Express™, InfiniBand™, Hypertransport™, FibreChannel™, Ethernet™ networks, and the like.

In an embodiment, baseboard 102 includes a keying system for each mezzanine card interface. In FIG. 1, first mezzanine card interface 108 has a corresponding first keying system 104, and second mezzanine card interface 110 has a corresponding second keying system 106. First keying system 104 allows only a mezzanine card configured for a certain operating voltage to be coupled to first mezzanine card interface 108. In the same manner, second keying system 106 allows only a mezzanine card configured for a certain operating voltage to be coupled to second mezzanine card interface 110.

In an embodiment, first keying system 104 and second keying system 106 include a mechanical portion on either or both of the baseboard 102 and mezzanine card to physically prevent a mezzanine card designed to operate at one operating voltage, from interfacing with a mezzanine card interface designed to supply a different operating voltage. In an embodiment of the invention, first keying system 104 and second keying system 106 also include a means of transmitting a voltage configuration signal to power control circuit 116.

In an embodiment, first keying system 104 and second keying system 106 can be independently configured for different operating voltages. In other words, first keying system 104 and second keying system 106 can be each independently configured to allow a different operating voltage to power first mezzanine card interface 108 and second mezzanine card interface 110 respectively. Once configured, first keying system 104 will only allow a mezzanine card that comports with the operating voltage it's configured for, to be coupled to first mezzanine card interface 108. Also, once configured, second keying system 106 will only allow a mezzanine card that comports with the operating voltage it's configured for to be coupled to the second mezzanine card interface 110.

Power control circuit 116 operates to regulate which operating voltage is applied to first mezzanine card interface 108 and second mezzanine card interface 110. For example, first keying system 104 can be configured to transmit first voltage configuration signal 112 to power control circuit 116, where first voltage configuration signal 112 indicates for which operating voltage first keying system 104 is configured. Also, second keying system 106 can be configured to transmit second voltage configuration signal 114 to power control circuit 116, where second voltage configuration signal 112 indicates for which operating voltage second keying system 106 is configured. For example, without limitation, first keying system 104 can be configured for either first operating voltage 118 or second operating voltage 120. Also, second keying system 106 can be configured for either first operating voltage 118 or second operating voltage 120.

Once power control circuit 116 receives either first voltage configuration signal 112 or second voltage configuration signal 114, it will power first mezzanine card interface 108 and second mezzanine card interface 110 with the operating voltage corresponding to each respective keying system and voltage configuration signal. For example, if power control circuit 116 receives a first configuration voltage signal 112 from first keying system 104, which is configured for first operating voltage 118, power control circuit 116 subsequently allows first operating voltage 118 to power first mezzanine card interface 108. This allows a mezzanine card designed to operate at first operating voltage 118 to interface with baseboard 102 via first mezzanine card interface 108 and operate using first operating voltage 118.

As another example, if power control circuit 116 receives a second voltage configuration signal 114 from second keying system 106, which is configured for second operating voltage 120, power control circuit 116 subsequently allows second operating voltage 120 to power second mezzanine card interface 110. This allows a mezzanine card designed to operate at second operating voltage 120 to interface with baseboard 102 via second mezzanine card interface 110 and operate using second operating voltage 120.

In an embodiment of the invention, if first mezzanine card interface 108 and second mezzanine card interface 110 are configured for the same bus (i.e. first bus 124 or second bus 126), then power control circuit 116 determines if there is an operating voltage compatibility between first voltage configuration signal 112 and second voltage configuration signal 114 before allowing either first operating voltage 118 or second operating voltage 120 to power first mezzanine card interface 108 or second mezzanine card interface 110. In this embodiment, if first mezzanine card interface 108 and second mezzanine card interface 110 are configured to use the same bus, then first mezzanine card interface 108 and second mezzanine card interface 110 are required to use the same operating voltage.

For example, with first mezzanine card interface 108 and second mezzanine card interface 110 configured to operate using first bus 124 (meaning any mezzanine cards coupled to these interfaces will communicate using first bus 124), if first voltage configuration signal 112 and second voltage configuration signal 114 indicate first operating voltage 118, then operating voltage compatibility is determined by power control circuit 116. With operating voltage compatibility indicated, power control circuit 116 powers first mezzanine card interface 108 and second mezzanine card interface 110 with first operating voltage 118.

As another example, with first mezzanine card interface 108 and second mezzanine card interface 110 configured to operate using first bus 124 (meaning any mezzanine cards coupled to these interfaces will communicate using first bus 124), if first voltage configuration signal 112 and second voltage configuration signal 114 indicate second operating voltage 120, then operating voltage compatibility is determined by power control circuit 116. With operating voltage compatibility indicated, power control circuit 116 powers first mezzanine card interface 108 and second mezzanine card interface 110 with second operating voltage 120.

In another embodiment, first mezzanine card interface 108 is configured for first bus 124 and second mezzanine card interface 110 is configured for second bus 126. In this configuration, first mezzanine card interface 108 and second mezzanine card interface 110 can operate with different operating voltages, or using the same operating voltage. Operating voltage compatibility is indicated if the first voltage configuration signal 112 indicates either first operating voltage 118 or second operating voltage 120, and if second voltage configuration signal 114 indicates either first operating voltage 118 or second operating voltage 120.

In the above embodiments, if voltage compatibility between first mezzanine card interface 108 and second mezzanine card interface 110 is not detected (i.e. fails), power control circuit 116 communicates configuration failure signal 122. Configuration failure signal 122 indicates that first keying system 104 and second keying system 106 are not configured properly given the first bus 124 and second bus configuration 126 as described above. In an embodiment, configuration failure signal 122 can cause a power interrupt to baseboard 102, light an indicator light for a user of computer system 100, operate other control logic functions, and the like.

Figure 2:
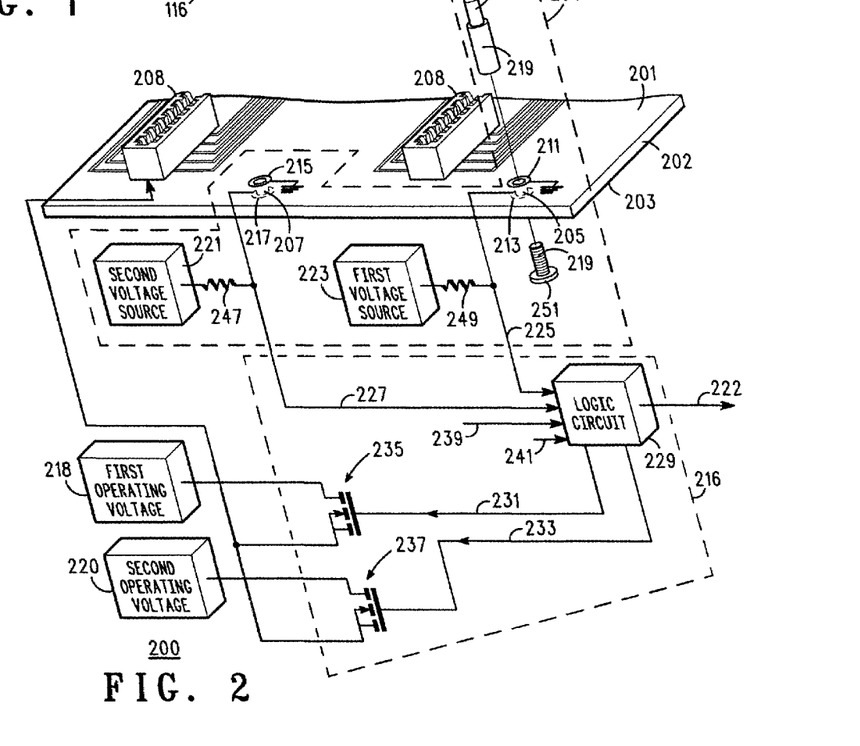
FIG. 2 is a block diagram of a computer system in accordance with another embodiment of the invention.

FIG. 2 is a block diagram of a computer system 200 in accordance with another embodiment of the invention. As shown in FIG. 2, baseboard 202 is illustrated along with an expanded view of first keying system 204 and an expanded view of power control circuit 216. Also, baseboard 202 includes first mezzanine card interface 208. First keying system 204 and first mezzanine card interface 208 as shown in FIG. 2 are representative, and second keying system 106 and second mezzanine card interface 110 have been omitted from FIG. 2 for clarity.

First keying system 204 includes keying mechanism 219, which can include key 250 and a fastening means 251, such as a screw, and the like. Key 250 can be any shaped member, that when attached to baseboard 202, protrudes so as to prevent or allow a mezzanine card to interface with first mezzanine card interface 208. In an embodiment, key 250 is designed to interface with a mezzanine card configured for an operating voltage corresponding to the location of the key within baseboard 202. Key 250 also protrudes so as to keep an improperly configured mezzanine card from interfacing with first mezzanine card interface 208. Fastening means 251 acts to securely couple key 250 to baseboard 202. Key 250 and fastening means 251 are known in the art.

First keying system 204 can also include first key opening 205 defined by first side 201 and second side 203 of baseboard 202. First key opening 205 corresponds to first operating voltage 218. In an embodiment, first key opening 205 is a non-plated through hole in baseboard 202 through which can be attached keying mechanism 219. First keying system 204 includes first key pad 211 on first side 201, and second key pad 213 on second side 203, where first key pad 211 and second key pad 213 are aligned via first key opening 205, and first key pad 211 and second key pad 213 are conductive and electrically isolated from each other. In the embodiment shown, first key pad 211 and second key pad 213 circumscribe first key opening 205 on first side 201 and second side 203 respectively. However, the key pad configuration shown is not limiting, and other key pad configurations are within the scope of the invention. For example, in an embodiment, first key pad 211 and second key pad 213 can circumscribe only a portion of first key opening 205.

In an embodiment, one of first key pad 211 and second key pad 213 is coupled to ground. In the embodiment shown in FIG. 2, first key pad 211 is coupled to ground. In another embodiment, second key pad 213 can be coupled to ground instead. Also, in the embodiment shown, second key pad 213 is coupled to first voltage source 223, where first voltage source 223, through resistor 249, pulls second key pad 213 up to a voltage higher than ground. In another embodiment, first voltage source 223 can pull second key pad 213 to a negative voltage below ground. In another embodiment, first key pad 211 is coupled to first voltage source 223 and second key pad 213 is grounded.

With no keying mechanism 219 installed in first key opening 205, second key pad 213 is in a "logic high" condition via first voltage source 223. Logic circuit 229 detects and therefore knows that no keying mechanism 219 is installed in first key opening 205 by detecting the "logic high" condition. This indicates that baseboard 202 is not configured for installation of a mezzanine card that operates using first operating voltage 218.

In an embodiment, keying mechanism 219 is conductive such that when keying mechanism 219 is installed in first key opening 205, second key pad 213 is shorted to first key pad 211. Keying mechanism 219 can be made from a conductive material, such as metal, and the like, or keying mechanism 219 can be coated with a conductive material, and the like, so as to allow second key pad 213 to be shorted to first key pad 211. When keying mechanism 219 is installed in first key opening 205, second key pad 213 is shorted to ground and is in a "logic low" condition. This "logic low" condition is transmitted to logic circuit 229 via first key signal 225. First key signal 225 indicates that second key pad 213 is in a "logic low" condition, and that keying mechanism 219 is installed in first key opening 205 to allow the use of a mezzanine card designed to operate using first operating voltage 218. Upon receiving first key signal 225, logic circuit 229 operates to permit first operating voltage 218 to power first mezzanine card interface 208.

First keying system 204 can also include second key opening 207 defined by first side 201 and second side 203 of baseboard 202. Second key opening 207 corresponds to second operating voltage 220. In an embodiment, second key opening 207 is a non-plated through hole in baseboard 202 through which can be attached keying mechanism 219. First keying system 204 includes third key pad 215 on first side 201, and fourth key pad 217 on second side 203, where third key pad 215 and fourth key pad 217 are aligned via second key opening 207, and third key pad 215 and fourth key pad 217 are conductive and electrically isolated from each other. In the embodiment shown, third key pad 215 and fourth key pad 217 circumscribe second key opening 207 on first side 201 and second side 203 respectively. However, the key pad configuration shown is not limiting, and other key pad configurations are within the scope of the invention. For example, in an embodiment, third key pad 215 and fourth key pad 217 can circumscribe only a portion of second key opening 207.

In an embodiment, one of third key pad 215 and fourth key pad 217 is coupled to ground. In the embodiment shown in FIG. 2, third key pad 215 is coupled to ground. In another embodiment, fourth key pad 217 can be coupled to ground instead. Also, in the embodiment shown, fourth key pad 217 is coupled to second voltage source 221, where second voltage source 221, through resistor 247, pulls fourth key pad 217 up to a voltage higher than ground. In another embodiment, second voltage source 221 can pull fourth key pad 217 to a negative voltage below ground. In another embodiment, third key pad 215 can be coupled to second voltage source 221 and fourth key pad 217 can be coupled to ground.

With no keying mechanism 219 installed in second key opening 207, fourth key pad 217 is in a "logic high" condition via second voltage source 221. Logic circuit 229 detects and therefore knows that no keying mechanism 219 is installed in second key opening 207. This indicates that baseboard 202 is not configured for installation of a mezzanine card that operates using second operating voltage 220.

In an embodiment, keying mechanism 219 is conductive such that when keying mechanism 219 is installed in second key opening 207, fourth key pad 217 is shorted to third key pad 215. Keying mechanism 219 can be made from a conductive material, such as metal, and the like, or keying mechanism 219 can be coated with a conductive material, and the like, so as to allow fourth key pad 217 to be shorted to third key pad 215. When keying mechanism 219 is installed in second key opening 207, fourth key pad 217 is shorted to ground and is in a "logic low" condition. This "logic low" condition is transmitted to logic circuit 229 via second key signal 227. Second key signal 227 indicates that fourth key pad 217 is in a "logic low" condition, and that keying mechanism 219 is installed in second key opening 207 to allow the use of a mezzanine card designed to operate using second operating voltage 220. Upon receiving second key signal 227, logic circuit 229 operates to permit second operating voltage 220 to power first mezzanine card interface 208.

In the embodiment shown, power control circuit 216 includes logic circuit 229 that receives either first key signal 225 or second key signal 227 from first keying system 204 to indicate that first mezzanine card interface 208 is configured to utilize either first operating voltage 218 or second operating voltage 220 as described above. Power control circuit 216 can also receive third key signal 239, indicating a first operating voltage 218 configuration for second keying system 106 and second mezzanine card interface 110. Power control circuit 216 can also receive fourth key signal 241, indicating a second operating voltage 220 configuration for second keying system 106 and second mezzanine card interface 110. Second keying system 106 (shown in FIG. 1) can be configured for first operating voltage 218 or second operating voltage 220 in an analogous manner to first keying system 204 described with reference to FIG. 2.

Power control circuit 216, subsequent to receiving the appropriate key signals, controls which operating voltage, if any is applied to a mezzanine card interface. As an example of an embodiment, logic circuit 229, upon receiving first key signal 225 indicating that first keying system 204 is configuring first mezzanine card interface 208 to receive a mezzanine card configured to use first operating voltage 218, can transmit first operating voltage ON signal 231 to first transistor 235. First transistor 235 then allows first operating voltage 218 to power first mezzanine card interface 208. As another example of another embodiment, logic circuit 229, upon receiving second key signal 227 indicating that first keying system 204 is configuring first mezzanine card interface 208 to receive a mezzanine card configured to use second operating voltage 220, can transmit second operating voltage ON signal 233 to second transistor 237. Second transistor 237 then allows second operating voltage 220 to power first mezzanine card interface 208. Power control circuit 216 can perform an analogous function for second keying system 106, and any number of other keying systems on baseboard 202.

The power control circuit 216 configuration depicted in FIG. 2 is not meant to limit the scope of the invention. Any structure or method of controlling first operating voltage 218 and second operating voltage 220 with respect to powering first mezzanine card interface 208 after receiving either first key signal 225 or second key signal 227 is within the scope of the invention. In other words, logic circuit 229, first transistor 235 and second transistor 237 are mere examples, and one skilled in the art can envision other methods of switching on and off first operating voltage 118 and second operating voltage 220 that are within the scope of the invention.

Figure 3:
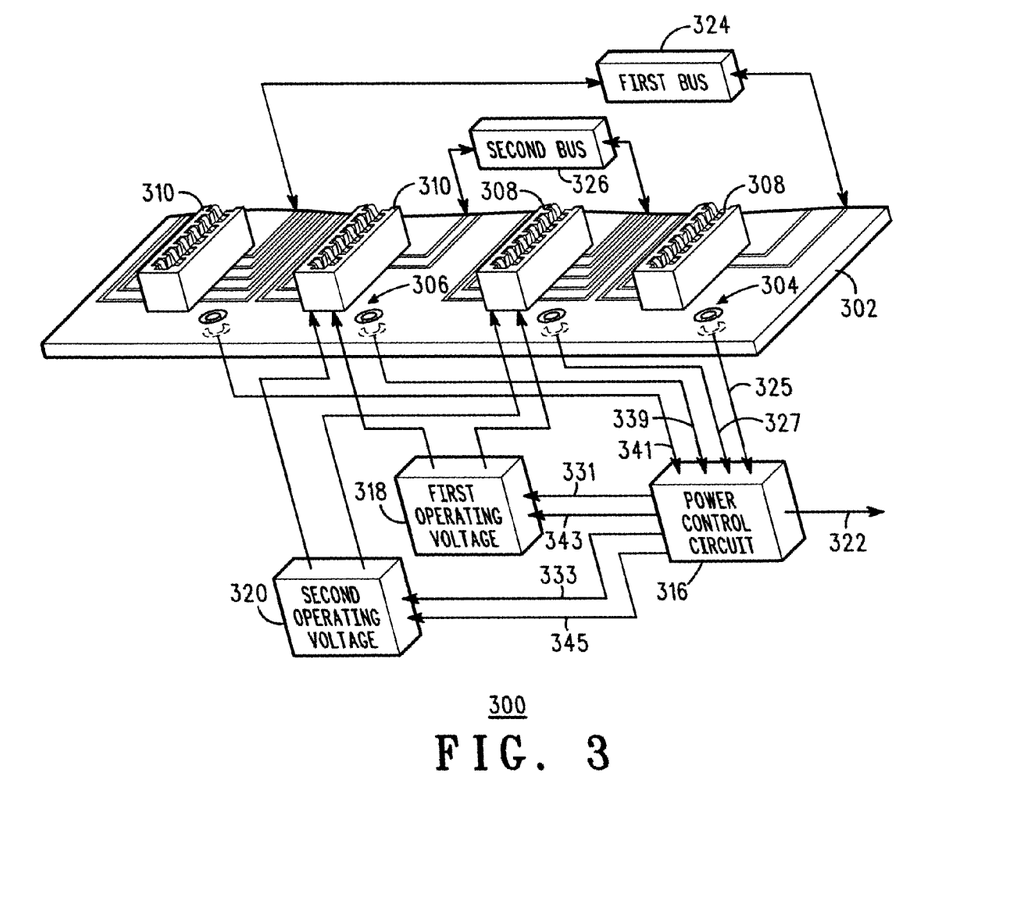
FIG. 3 is a block diagram of a computer system in accordance with still another embodiment of the invention.

FIG. 3 is a block diagram of a computer system 300 in accordance with still another embodiment of the invention. As shown in FIG. 3, baseboard 302 includes first mezzanine card interface 308 along with first keying system 304 (key, fastening means, first voltage source and second voltage source have been omitted for clarity). Also shown is second mezzanine card interface 310 with second keying system 306. Second keying system 306 has elements and features analogous to those shown in first keying system 304 as described above. First mezzanine card interface 308 and second mezzanine card interface 310 can be coupled to any combination of first bus 324 and second bus 326. For example, in an embodiment, computer system 300 can include only first bus 324 or second bus 326. In another embodiment, first bus 324 and second bus 326 can be utilized.

In an embodiment, computer system 300 includes only one bus, either first bus 324 or second bus 326. In other words, both first mezzanine card interface 308 and second mezzanine card interface 310 are coupled to only one bus, either first bus 324 or second bus 326. In an embodiment, first keying system 304 is configured to first operating voltage 318 so that first key signal 325 is communicated to power control circuit 316. Also, second keying system 306 is configured to first operating voltage 318 so that third key signal 339 is communicated to power control circuit 316. Since, in this embodiment, first keying system 304 and second keying system 306 are configured to operate using first operating voltage 318, power control circuit 316 permits first operating voltage 318 to power both first mezzanine card interface 308 and second mezzanine card interface 310.

In another embodiment, first keying system 304 is configured to second operating voltage 320 so that second key signal 327 is communicated to power control circuit 316. Also, second keying system 306 is configured to second operating voltage 320 so that fourth key signal 341 is communicated to power control circuit 316. Since, in this embodiment, first keying system 304 and second keying system 306 are configured to operate using second operating voltage 320, power control circuit 316 permits second operating voltage 320 to power both first mezzanine card interface 308 and second mezzanine card interface 310.

In this embodiment, where first mezzanine card interface 308 and second mezzanine card interface 310 are both configured to communicate with only one bus, both first mezzanine card interface 308 and second mezzanine card interface 310 must operate using the same operating voltage.

In another embodiment, where first mezzanine card interface 308 and second mezzanine card interface 310 are both configured to communicate using the same bus, if power control circuit receives key signals such that first keying system 304 and second keying system 306 are not configured for the same operating voltage, configuration failure signal 322 can be transmitted to alert an operator of computer system 300, operate other logic, forbid first operating voltage 318 and second operating voltage 320 from operating either first mezzanine card interface 308 and second mezzanine card interface 310, and the like. In effect, first keying system 304 and second keying system 306 operate as a safety mechanism to prevent powering of mezzanine card interfaces when the operating voltages are incompatible or the baseboard 302 is not keyed in conformance with baseboard limitations, such as number of buses, bus configuration, and the like.

As an example of an embodiment, if power control circuit 316 receives first key signal 325 (indicating first keying system 304 is configured for first operating voltage 318) and fourth key signal 341 (indicating second keying system 306 is configured for second operating voltage 320), power control circuit 316 forbids first operating voltage 318 and second operating voltage 320 from powering either first mezzanine card interface 308 or second mezzanine card interface 310.

As another example of an embodiment, if power control circuit 316 receives second key signal 327 (indicating first keying system 304 is configured for second operating voltage 320) and third key signal 339 (indicating second keying system 306 is configured for first operating voltage 318), power control circuit 316 forbids first operating voltage 318 and second operating voltage 320 from powering either first mezzanine card interface 308 or second mezzanine card interface 310.

In yet another embodiment, first mezzanine card interface 308 and second mezzanine card interface 310 are configured to operate off of different buses. For example, first mezzanine card interface 308 is configured to operate using first bus 324 and second mezzanine card interface 310 is configured to operate using second bus 326. In this embodiment, first keying system 304 and second keying system 306 can be configured for different operating voltages. In other words, first keying system 304 and second keying system 306 can be configured such that first mezzanine card interface 308 and second mezzanine card interface 310 operate using different operating voltages.

Once power control circuit 316 receives key signals such that first mezzanine card interface 308 and second mezzanine card interface 310 are permitted to operate using one of first operating voltage 318 and second operating voltage 320, power control circuit 316 can control first operating voltage 318 and second operating voltage 320 as applied to first mezzanine card interface 308 and second mezzanine card interface 310 via first operating voltage ON signal 331, 343 and second operating voltage ON signal 333, 345 in an analogous manner to that described above.

Figure 4:
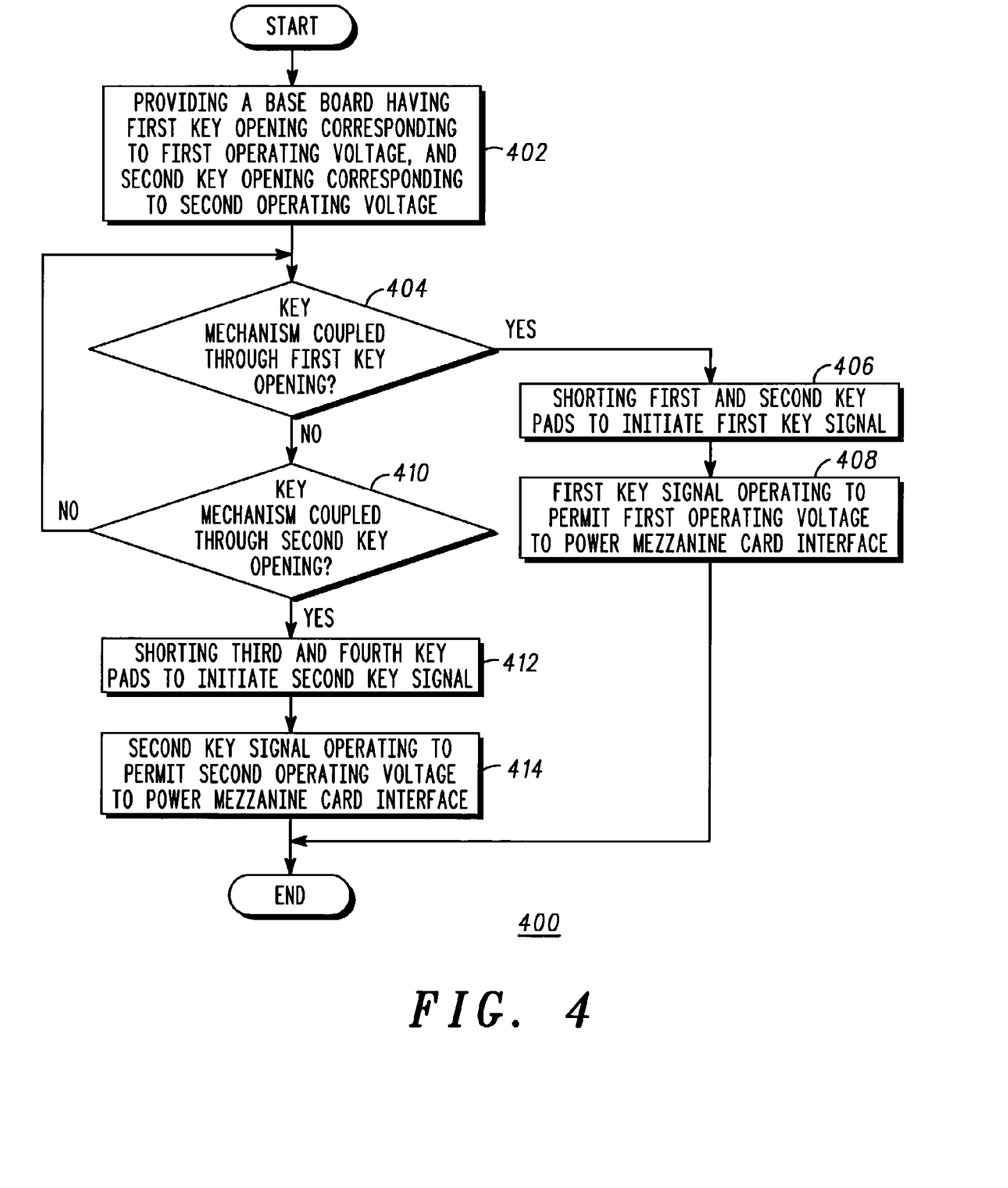
FIG. 4 is a flow chart in accordance with an embodiment of the invention.

FIG. 4 is a flow chart 400 in accordance with an embodiment of the invention. In step 402, a baseboard 202 is provided having a first key opening 205 corresponding to a first operating voltage 218 and a second key opening 207 corresponding to a second operating voltage 220. In step 404 it is determined if keying mechanism 219 is coupled through first key opening 205. If so, first key pad 211 and second key pad 213 are shorted to initiate first key signal 225 per step 406. In step 408, first key signal 225 operates to permit first operating voltage 218 to power mezzanine card interface.

If keying mechanism 219 is not coupled through first key opening 205 in step 404, it is determined if keying mechanism 219 is coupled through second key opening 207 per step 410. If so, third key pad 215 and fourth key pad 217 are shorted to initiate second key signal 227 per step 412. In step 414, second key signal 227 operates to permit second operating voltage 220 to power mezzanine card interface.

Figure 5:
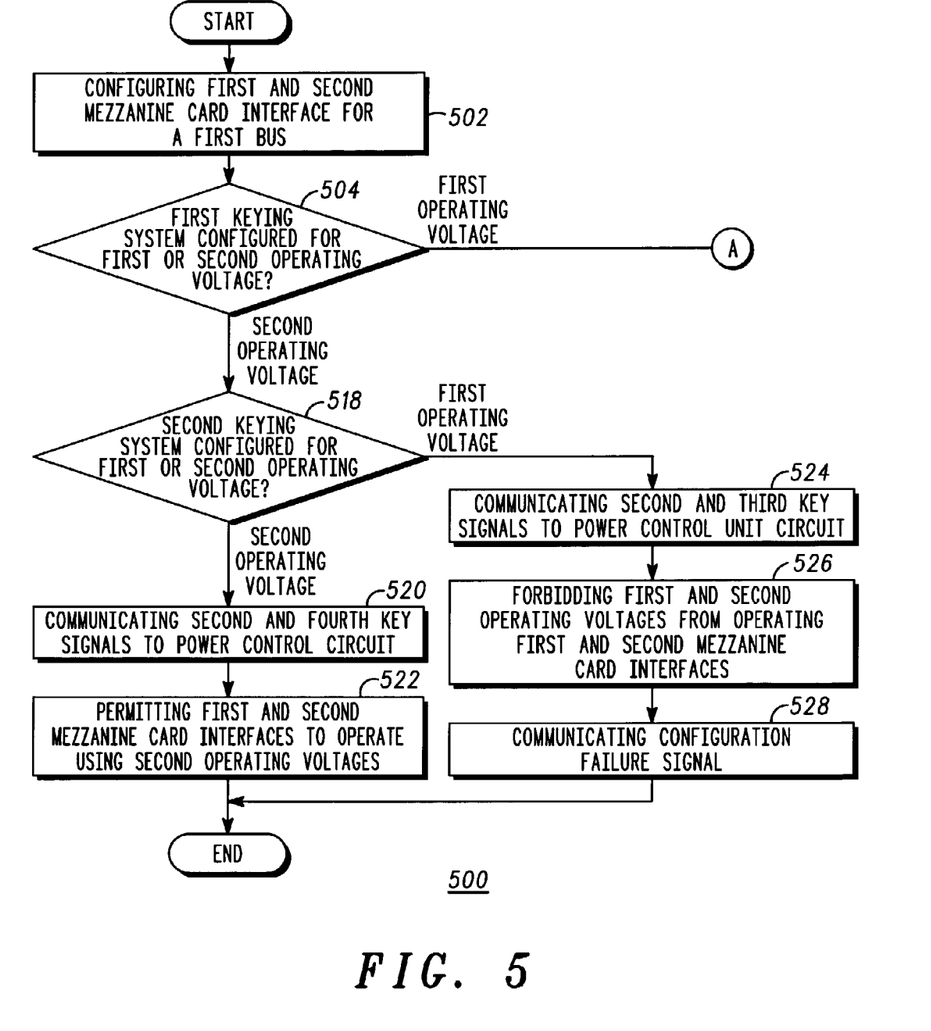
FIGS. 5 and 6 are a flow chart in accordance with another embodiment of the invention.
Figure 6:
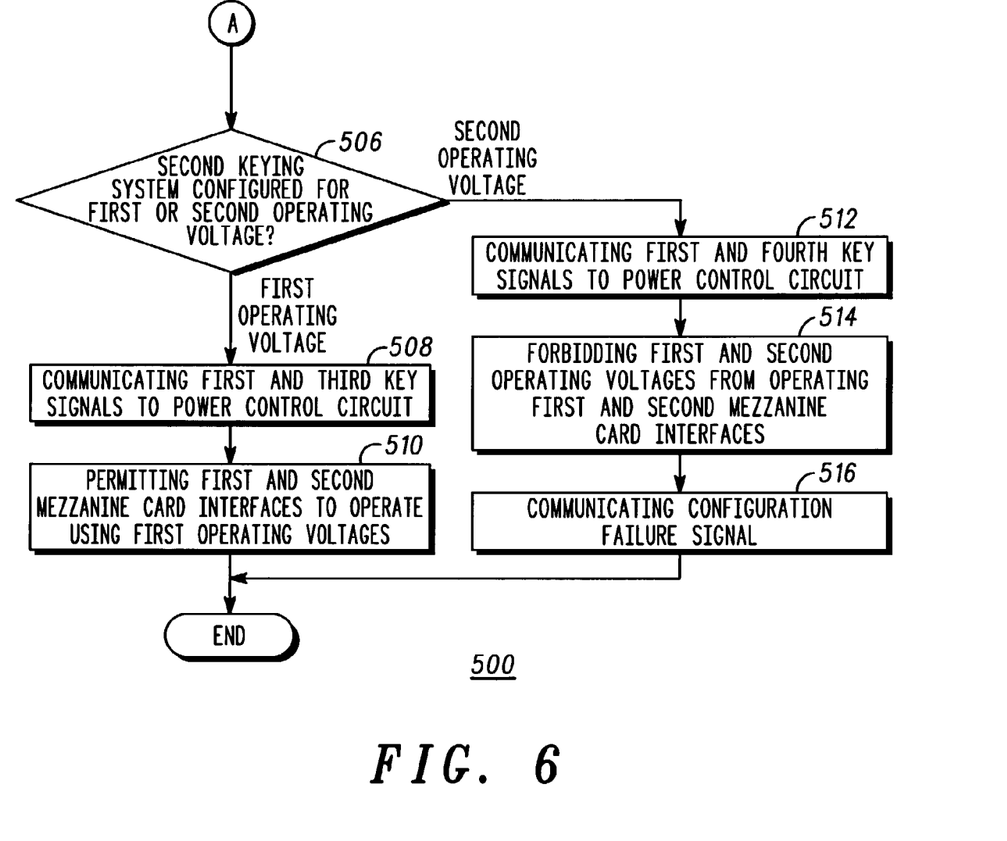

FIGS. 5 and 6 are a flow chart 500 in accordance with another embodiment of the invention. In step 502, first mezzanine card interface 308 and second mezzanine card interface 310 are configured to operate using first bus 324. In step 504 it is determined if first keying system 304 is configured for first operating voltage 318 or second operating voltage 320. If first operating voltage 318, it is then determined if second keying system 306 is configured for first operating voltage 318 or second operating voltage 320 in step 506. If first operating voltage 318, then first key signal 325 and third key signal 339 are communicated to power control circuit 316 per step 508. Subsequently in step 510, power control circuit 316 permits first mezzanine card interface 308 and second mezzanine card interface 310 to operate using first operating voltage 318.

If second keying system 306 is configured for second operating voltage 320 in step 506, then first key signal 325 and fourth key signal 341 are communicated to power control circuit 316 per step 512. Subsequently in step 514, power control circuit 316 forbids first operating voltage 318 and second operating voltage 320 from operating first mezzanine card interface 308 and second mezzanine card interface 310. In step 516, power control circuit 316 communicates configuration failure signal 322.

If first keying system 304 is configured for second operating voltage in step 504, it is determined if second keying system 306 is configured for first operating voltage 318 or second operating voltage 320 in step 518. If second operating voltage 320, then second key signal 327 and fourth key signal 341 are communicated to power control circuit 316 per step 520. Subsequently in step 522, power control circuit 316 permits first mezzanine card interface 308 and second mezzanine card interface 310 to operate using second operating voltage 320.

If second keying system 306 is configured for first operating voltage 318 in step 518, then second key signal 327 and third key signal 339 are communicated to power control circuit 316 per step 524. Subsequently in step 526, power control circuit 316 forbids first operating voltage 318 and second operating voltage 320 from operating first mezzanine card interface 308 and second mezzanine card interface 310. In step 528, power control circuit 316 communicates configuration failure signal 322.

Figure 7:
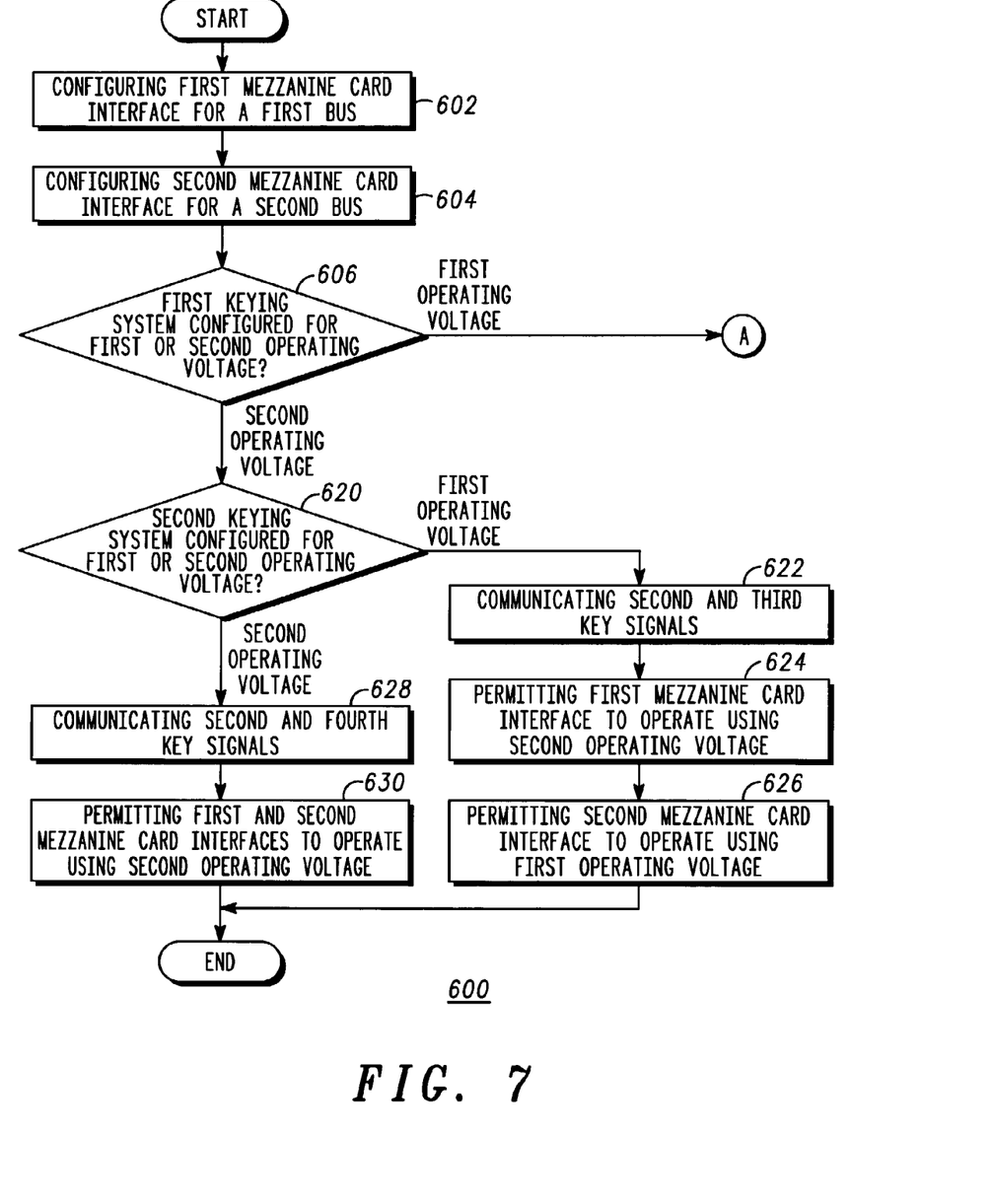
FIGS. 7 and 8 are a flow chart in accordance with still another embodiment of the invention.
Figure 8:
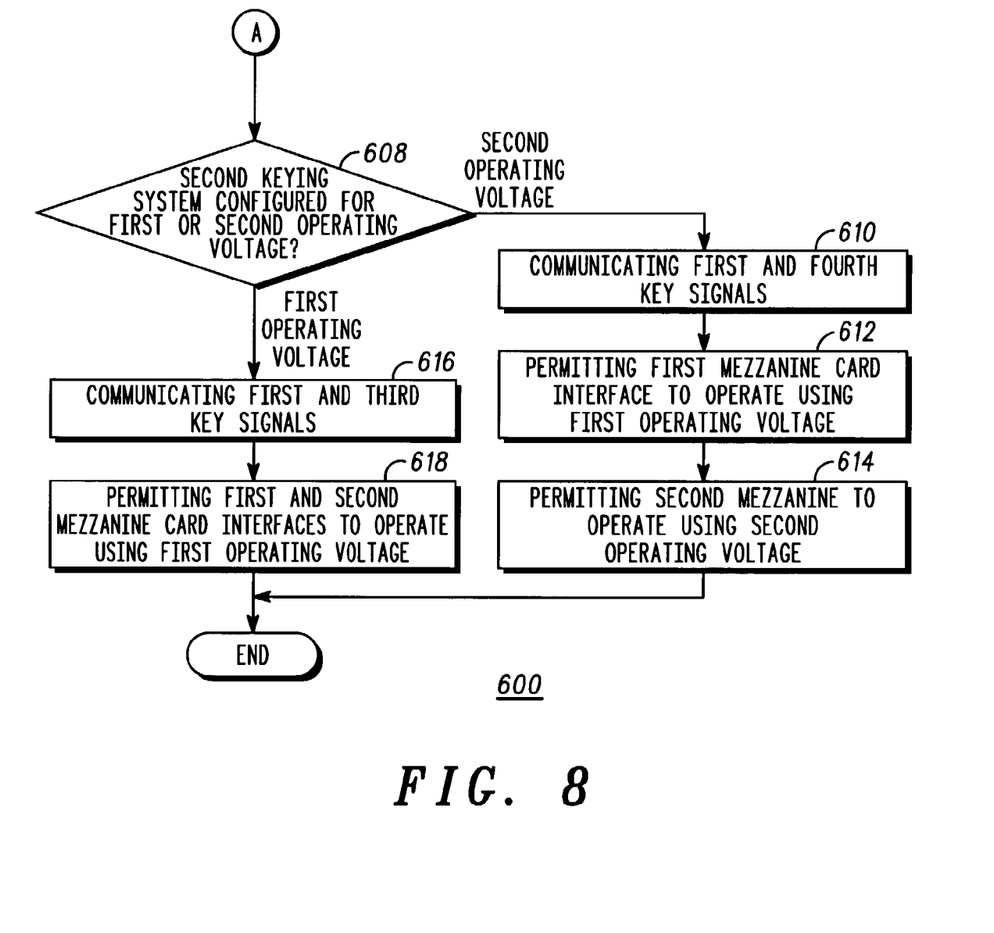

FIGS. 7 and 8 are a flow chart 600 in accordance with still another embodiment of the invention. In step 602, first mezzanine card interface 308 is configured to operate using first bus 324. In step 604, second mezzanine card interface 310 is configured to operate using second bus 326. In step 606 it is determined if first keying system 304 is configured for first operating voltage 318 or second operating voltage 320. If first operating voltage 318, it is then determined if second keying system 306 is configured for first operating voltage 318 or second operating voltage 320 in step 608. If first operating voltage 318, then first key signal 325 and third key signal 339 are communicated to power control circuit 316 per step 616. Subsequently in step 618, power control circuit 316 permits first mezzanine card interface 308 and second mezzanine card interface 310 to operate using first operating voltage 318.

If second keying system 306 is configured for second operating voltage 320 in step 608, then first key signal 325 and fourth key signal 341 are communicated to power control circuit 316 per step 610. Subsequently in step 612, power control circuit 316 permits first mezzanine card interface 308 to operate using first operating voltage 318. In step 614, power control circuit 316 permits second mezzanine card interface 310 to operate using second operating voltage 320.

If first keying system 304 is configured for second operating voltage in step 606, it is determined if second keying system 306 is configured for first operating voltage 318 or second operating voltage 320 in step 620. If second operating voltage 320, then second key signal 327 and fourth key signal 341 are communicated to power control circuit 316 per step 628. Subsequently in step 630, power control circuit 316 permits first mezzanine card interface 308 and second mezzanine card interface 310 to operate using second operating voltage 320.

If second keying system 306 is configured for first operating voltage 318 in step 620, then second key signal 327 and third key signal 339 are communicated to power control circuit 316 per step 622. Subsequently in step 624, power control circuit 316 permits first mezzanine card interface 308 to operate using second operating voltage 320. In step 626, power control circuit 316 permits second mezzanine card interface 310 to operate using first operating voltage 318.

Figure 9:
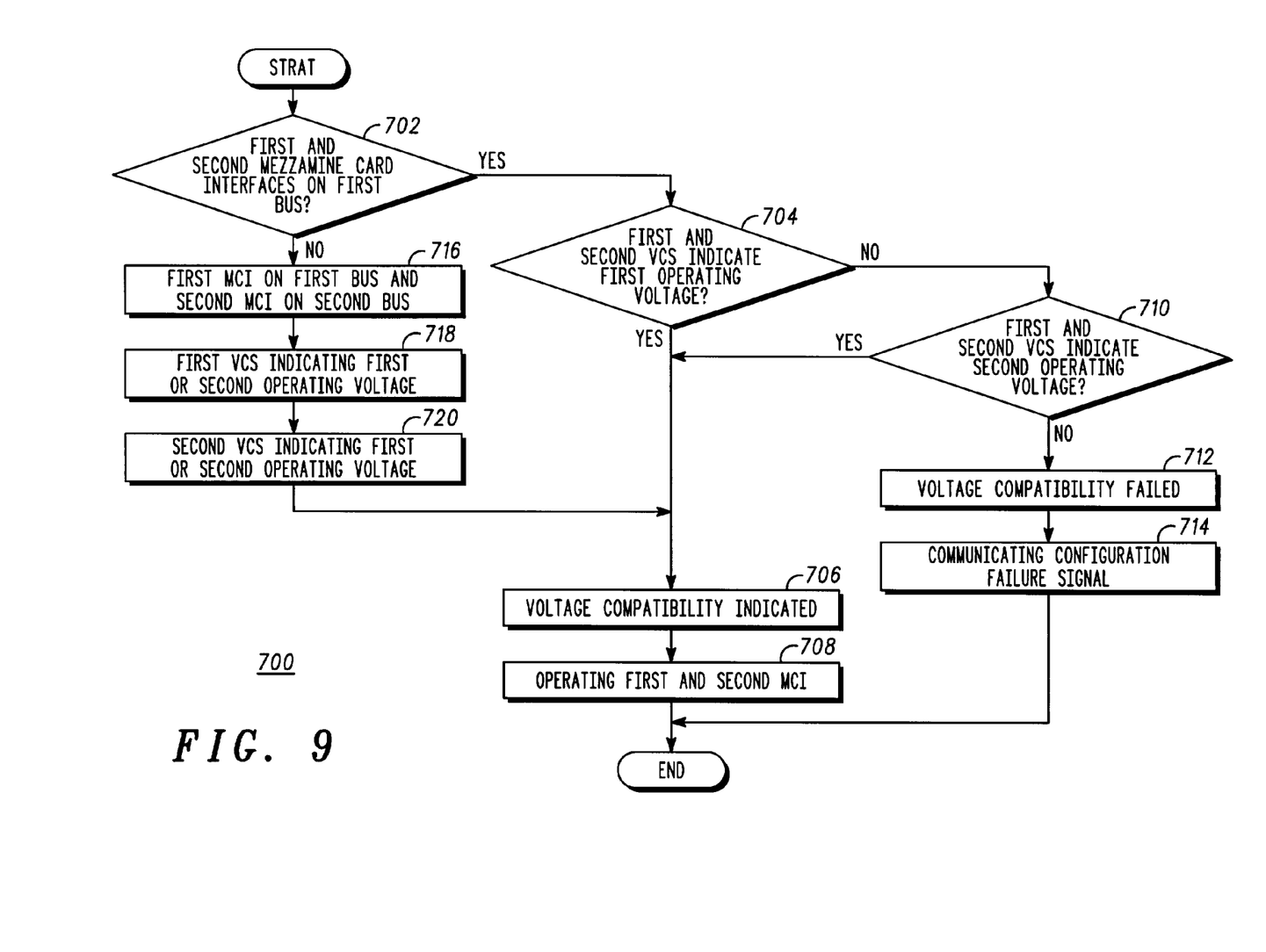
FIG. 9 is a flow chart in accordance with yet another embodiment of the invention.

FIG. 9 is a flow chart 700 in accordance with yet another embodiment of the invention. In step 702 it is determined if first mezzanine card interface 108 and second mezzanine card interface 110 are both on first bus 124. If not, first mezzanine card interface 108 (MCI) is on first bus 124 and second mezzanine card interface 110 is on second bus 126 per step 716. In step 718, first voltage configuration signal (VCS) 112 indicates first operating voltage 318 or second operating voltage 320 via first keying system 104. In step 720, second voltage configuration signal 114 indicates first operating voltage 318 or second operating voltage 320 via second keying system 106. Subsequently, operating voltage compatibility is indicated per step 706. Power control circuit 116 then operates first mezzanine card interface 108 and second mezzanine card interface 110 in accordance with the respective operating voltage configurations indicated by first keying system 104 and second keying system 106 respectively per step 708.

If first mezzanine card interface 108 and second mezzanine card interface 110 are both configured to operate on first bus 124 per step 702, it is then determined if both first voltage configuration signal 112 and second voltage configuration signal 114 indicate first operating voltage 318. If so, operating voltage compatibility is indicated per step 706. Power control circuit 116 then operates first mezzanine card interface 108 and second mezzanine card interface 110 using first operating voltage 318 per step 708.

If first voltage configuration signal 112 and second voltage configuration signal 114 do not indicate first operating voltage 318 per step 704, it is then determined if both first voltage configuration signal 112 and second voltage configuration signal 114 indicate second operating voltage 320 per step 710. If so, operating voltage compatibility is indicated per step 706. Power control circuit 116 then operates first mezzanine card interface 108 and second mezzanine card interface 110 using second operating voltage 318 per step 708. If not, then voltage compatibility has failed per step 712, and configuration failure signal is communicated per step 714.

While we have shown and described specific embodiments of the present invention, further modifications and improvements will occur to those skilled in the art. It is therefore to be understood that appended claims are intended to cover all such modifications and changes as fall within the true spirit and scope of the invention.

What is claimed is:

1. A computer system, comprising:
 a baseboard having a first side and a second side; wherein the first side and the second side define a first key opening;
 a first key pad located on the first side, wherein the first key pad is grounded;
 a second key pad located on the second side, wherein the second key pad is aligned with the first key pad via the first key opening, wherein the second key pad is coupled to a first voltage source, and wherein the second key pad is electrically isolated from the first key pad;
 a mezzanine card interface coupled to the baseboard; and
 a keying mechanism coupled to interface with the baseboard through the first key opening, wherein coupling the keying mechanism to the baseboard shorts the second key pad to the first key pad and initiates a first key signal, and wherein the first key signal operates to permit a first operating voltage to power the mezzanine card interface.

2. The computer system of claim 1, further comprising:
the first side and the second side defining a second key opening;
a third key pad located on the first side, wherein the third key pad is grounded;
a fourth key pad located on the second side, wherein the fourth key pad is aligned with the third key pad via the second key opening, wherein the fourth key pad is coupled to a second voltage source, and wherein the fourth key pad is electrically isolated from the third key pad; and
the keying mechanism coupled to interface wit the baseboard through the second key opening, wherein coupling the keying mechanism to the baseboard shorts the third key pad to the fourth key pad and initiates a second key signal, and wherein ,the second key signal operates to permit a second operating voltage to power the mezzanine card interface.

3. The computer system of claim 1, wherein the baseboard is one of a VMEbus board, AdvancedTCA board, APS board and CompactPCI board.

4. The computer system of claim 1, wherein the mezzanine card interface is a common mezzanine card interface.

5. The computer system of claim 1, wherein the mezzanine card interface is a PCI mezzanine card interface.

6. A baseboard, comprising:
the baseboard having a first side and a second side; wherein the first side and the second side define a first key opening;
a first key pad located on the first side; wherein the first key pad is grounded;
a second key pad located on the second side, wherein the second key pad is aligned with the first key pad via the first key opening, wherein the second key pad is coupled to a first voltage source, and wherein the second key pad is electrically isolated from the first key pad;
a mezzanine card interface coupled to the baseboard; and
a keying mechanism coupled to interface with the baseboard through the first key opening, wherein coupling the keying mechanism to the baseboard shorts the second key pad to the first key pad and initiates a first key signal, and wherein the first key signal operates to permit a first operating voltage to power the mezzanine card interface.

7. The baseboard of claim 6, further comprising:
the first side and the second side defining a second key opening;
a third key pad located on the first side, wherein the third key pad is grounded;
a fourth key pad located on the second side, wherein the fourth key pad is aligned with the third key pad via the second key opening, wherein the fourth key pad is coupled to a second voltage source, and wherein the fourth key pad is electrically isolated from the third key pad; and
the keying mechanism coupled to interface with the baseboard through the second key opening, wherein coupling the keying mechanism to the baseboard shorts the third key pad to the fourth key pad and initiates a second key signal, and wherein the second key signal operates to permit a second operating voltage to power the mezzanine card interface.

8. The baseboard of claim 6, wherein the baseboard is one of a VMEbus board, AdvancedTCA board, APS board and CompactPCI board.

9. The baseboard of claim 6, wherein the mezzanine card interface is a common mezzanine card interface.

10. The baseboard of claim 6, wherein the mezzanine card interface is a PCI mezzanine card interface.

11. A method of selecting an operating voltage, comprising:
providing a baseboard having a first side and a second side, wherein the first side and the second side define a first key opening and a second key opening, wherein the first key opening corresponds to a first operating voltage, and wherein the second key opening corresponds to a second operating voltage;
if a keying mechanism is coupled to the baseboard through the first key opening, a first key signal operating to permit the first operating voltage to power a mezzanine card interface; and
if the keying mechanism is coupled to the baseboard through the second key opening, a second key signal operating to permit the second operating voltage to power the mezzanine card interface.

12. The method of claim 11, further comprising:
providing a first key pad located on the first side, wherein the first key pad is grounded;
providing a second key pad located on the second side, wherein the second key pad is aligned with the first key pad via the first key opening, wherein the second key pad is coupled to a first voltage source, and wherein the second key pad is electrically isolated from the first key pad; and
shorting the second key pad to the first key pad to initiate the first key signal.

13. The method of claim 11, further comprising:
providing a third key pad located on the first side, wherein the third key pad is grounded;
providing a fourth key pad located on the second side, wherein the fourth key pad is aligned with the third key pad via the second key opening, wherein the fourth key pad is coupled to a second voltage source, and wherein the fourth key pad is electrically isolated from the third key pad; and
shorting the third key pad to the fourth key pad to initiate the second key signal.

14. The method of claim 11, wherein the baseboard is one of a VMEbus board, AdvancedTCA board, APS board and CompactPCI board.

15. The method of claim 11, wherein the mezzanine card interface is a common mezzanine card interface.

16. The method of claim 11, wherein the mezzanine card interface is a PCI mezzanine card interface.

17. A method-of configuring a baseboard to power a mezzanine card interface, comprising:
the baseboard having a first side and a second side, wherein the first side and the second side define a first key opening and a second key opening, wherein the first key opening corresponds to a first operating voltage, and wherein the second key opening corresponds to a second operating voltage;
if a keying mechanism is coupled to the baseboard through the first key opening, a first key signal operating to permit the first operating voltage to power the mezzanine card interface; and if the keying mechanism is coupled to the baseboard through the second key opening, a second key signal operating to permit the second operating voltage to power the mezzanine card interface.

18. The method of claim 17, further comprising:

providing a first key pad located on the first side, wherein the first key pad is grounded;

providing a second key pad located on the second side, wherein the second key pad is aligned with the first key pad via the first key opening, wherein the second key pad is coupled to a first voltage source, and wherein the second key pad is electrically isolated from the first key pad; and shorting the second key pad to the first key pad to initiate the first key signal.

19. The method of claim 17, further comprising:

providing a third key pad located on the first side, wherein the third key pad is grounded;

providing a fourth key pad located on the second side, wherein the fourth key pad is aligned with the third key pad via the second key opening, wherein the fourth key pad is coupled to a second voltage source, and wherein the fourth key pad is electrically isolated from the third key pad; and shorting the third key pad to the fourth key pad to initiate the second key signal.

20. The method of claim 17, wherein the baseboard is one of a VMEbus board, AdvancedTCA board, APS board and CompactPCI board.

21. The method of claim 17, wherein the mezzanine card interface is a common mezzanine card interface.

22. The method of claim 17, wherein the mezzanine card interface is a PCI mezzanine card interface.

* * * * *